United States Patent [19]
Hackel et al.

[11] Patent Number: 5,806,047
[45] Date of Patent: Sep. 8, 1998

[54] SYSTEM FOR COMBINED POOL PORTFOLIO

[75] Inventors: Kenneth S. Hackel, Tenafly; Joshua Livnat, Teaneck, both of N.J.

[73] Assignee: Metlife Life Insurance Company, New York, N.Y.

[21] Appl. No.: 533,132

[22] Filed: Sep. 25, 1995

[51] Int. Cl.[6] ....................................................... G06F 17/60
[52] U.S. Cl. ................................................ 705/36; 705/37
[58] Field of Search .................................... 395/201, 207, 395/230, 235, 236; 705/35, 36

[56] References Cited

U.S. PATENT DOCUMENTS

| | | |
|---|---|---|
| 4,750,121 | 6/1988 | Halley et al. . |
| 4,933,842 | 6/1990 | Durbin et al. . |
| 5,101,353 | 3/1992 | Lupien et al. . |
| 5,126,936 | 6/1992 | Champion et al. . |
| 5,148,365 | 9/1992 | Dembo . |
| 5,193,056 | 3/1993 | Boes . |

FOREIGN PATENT DOCUMENTS

WO 95/06290   3/1995   European Pat. Off. .

OTHER PUBLICATIONS

Watson, Ronald D., "Does targeted investing make sense?" Financial Management, V23, N4, pp. 69–74, Wntr 1994.

Mylnechuk, Larry H., "GIC Future Guided by Participant Desire for Stable Asset," Pension World, V28, N5, pp. 21–23, May 1992.

Anonymous, "GICs in a new guise," Institutional Investor, V28, N1, p. 138, Jan. 1994.

Sellon, Gordon, "Changes in Financial Intermediation: The Role of Pension and Mutual Funds, " Economic Review, V77, N3, pp. 53–70, Fall 1992.

Primary Examiner—Gail O. Hayes
Assistant Examiner—Phillp Groutt
Attorney, Agent, or Firm—Fulbright & Jaworski L.L.P.

[57] ABSTRACT

A data processing system is disclosed for contributed employer securities in pension accounts which is directed specifically to the control, tracing of transactions and allocation of available assets among participants. This system allows pension plans and individuals' pension accounts which own employer securities to transfer the employer securities into a combined pool. The pool manages the combined portfolio, selling portions of the contributed stocks and purchasing other financial instruments to increase diversification. The system checks prospective participants for pre-specified admission requirements and traces the flow of securities and cash between the combined pool and the participants.

10 Claims, 5 Drawing Sheets

SYSTEM FOR COMBINED POOL PORTFOLIO

FIELD OF INVENTION

The invention generally relates to a data processing system for managing complex investment vehicles directed to pension plans having contributed employer securities. In particular, the present invention is directed to a data processing system governed by programming to monitor and manage a plethora of differing financial assets among a plurality of discrete accounts for creating a diversified portfolio having lower risk than for the individual partcipant's portfolio.

BACKGROUND OF THE INVENTION

The management of pension plans having investment portfolios has taken on significant importance in recent years, particularly with the advent of many new and complex investment vehicles and the changing role of governmental taxation policies. It has been recognized that different pension plan participants will have differing investment objectives and needs. Plan sponsors also attempt to provide pension benefits subject to their own constraints and opportunities. It has also been recognized that many assets provide differing rates of return and levels of associated risk. The intersection of these characteristics results in a large array of variables.

To effect rational investing, there have been a variety of computer systems designed to collect information regarding select pension plan participants and allocate the selection of investment vehicles to coordinate the risk/reward in a manner corresponding to each participant. These systems work on a microscopic approach and are subject to all the variances that working on individualized selection will create, in particular, the optimization of risk versus reward for these individually managed plans is mostly a matter of chance. This problem is compounded when a portion of the assets which make up the employee pension plans are based on the employer's own contributed stock.

For a brief background, there are two general types of pension plans—(1) defined benefit plans and (2) defined contribution plans. Defined benefit plans promise the employees a specified level of benefits upon retirement. Employers make contributions to a pension fund which is common to all participants in the plan. Such contributions are generally invested in financial instruments and, along with the returns, are used to pay the promised, future benefits. On the other hand, defined contribution plans require employers to make a certain level of current contributions to plans or funds which the employer or the employee chooses. Typically, each participant in a defined contribution plan has an individual account which contains a pro rata share of the investment assets.

Many corporate entities contribute their own publicly-traded shares into their employees' pension plans in either defined benefit plans or defined contribution plans. Corporations may contribute their own stock to a pension plan for several reasons. For example, using contributed stock defers any need for more liquid assets such as cash which can be used to finance other profitable projects. Indeed, the contributed stock remains in friendly hands and may be used to avert a hostile takeover. Furthermore, employees who see their retirement benefits dependent on their own firm's stock may be motivated to increase their own firm's share value and as such, represents a separate working incentive.

However, from the employee's point of view, the employer's contributed stock does not provide the employee with any meaningful diversification. The employee's current labor income is also dependent on the employer's success. Thus, the dependence of retirement payments on the employer's stock prices is compounded to the dependence on the economic success of the employer. The described scenario is undesirable for most employees given the additional risk factors, but is, unfortunately, a present reality for many participants of defined benefit plans, defined contribution plans and the like.

The present invention addresses the problems in the art, such as identified above, by providing a data processing system directed to managing pension accounts and permitting diversification of single employer stock investments.

OBJECTS AND SUMMARY OF THE PRESENT INVENTION

It is an object of the present invention to provide an improved data processor system for managing a plurality of pension accounts and selectively diversifying account portfolios of the pension plans comprising employer contributed securities.

It is another object of the present invention to provide a data processing implementation for an investment program which monitors contributed employer securities in pension accounts, controls transactions, and allocates available assets among participants.

It is yet another object of the present invention to provide a system that manages pension plans comprising employer securities, by effecting the transfer of such securities into a separate asset pool, managing the combined portfolio, selling portions of the contributed stocks and purchasing other financial instruments (including call options, puts, futures and the like) to increase diversification and manage risk.

It is a further object of the present invention to provide a system which allows pension plan participants who own employer contributed stocks to diversify such holdings while maintaining an ability to benefit from their own employer's stock return.

The above and other objects of the present invention are realized in a specific illustrative investment management system for pension plans having employer contributed securities. The program controlled system manages a plurality of individual accounts corresponding to different corporate pension plans or employee pension accounts. These separate accounts are capitalized by the funds in the various pension accounts including stock in the sponsoring corporation. These securities are thereafter placed in a single portfolio which, based on contributions from many different stock sources, becomes highly diversified. The present system has the further capability to implement a sale of a portion of these employer contributed securities to obtain additional diversification through purchase of a market "basket" of securities and re-weighing the original portfolio.

Initially, the system examines potential participants for pre-specified admission requirements, and selects certain important parameters for the participant. It further determines the market value of the contributed employer securities on the admission date, as well as the current balances of other participants. It then manages the combined portfolio to track the performance of a pre-selected market index, taking into consideration current participants and desirable diversification characteristics. It also periodically allocates the available assets in the combined portfolio to individual participants' accounts based on their own employer security returns and the combined portfolio returns. The system also provides participants with benefit payments as required initially by participants.

In addition, the system invests dividends on the original employer securities in other financial instruments to obtain further diversification and risk management according to portfolio optimization techniques. Participants can select the proportion of future returns on their own employer's stock that can be accrued in their own account and the proportion of the combined portfolio return that is allocated to them. In this manner, a portion of the increases in their employer's security prices is directly beneficial to them. Thus, participants are motivated to increase share-holders value, which is also beneficial to the employer.

Under most circumstances, only a small portion of the employer stocks will be sold, and, therefore, the employer stock remains in friendly hands. Stocks options may also be used to preserve gains. The system provides employees with additional diversification without mitigating the benefits to employers. The foregoing and additional features and advantages of the instant invention will become more readily apparent from the following detailed description of a specific illustrative embodiment presented below in conjunction with the accompanying drawings in which:

DESCRIPTION OF THE PRESENT INVENTION

First briefly in overview, the present invention is a program controlled data processor that includes subsystems to permit data input, communication, interactive control, select reporting, output and data monitoring functions. As such the system includes a control processor, memory—including a database of accounts and associated parameters, display and keyboard for interactive system control and communication sub-system. The above hardware components are typically formed in many general purpose computers with the size and complexity dependent on the scale of operation.

The system is structured and programmed to manage a plurality of individual pension-backed accounts. Each account has a corresponding record in memory comprising the data on that account.

Figure 1:
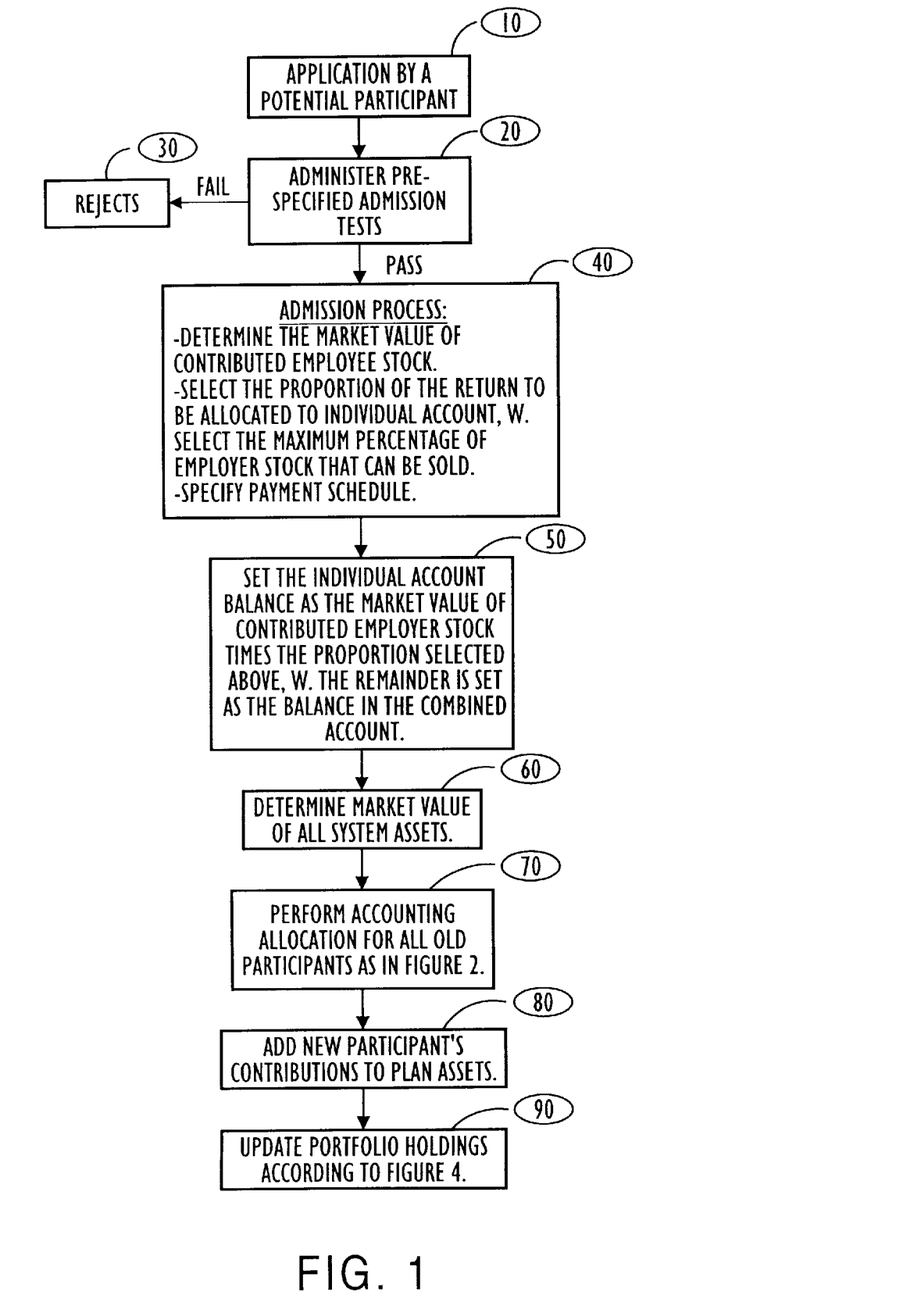
FIG. 1 is a logic flow chart depicting the data processing for testing and admission of potential participants in the system in accordance with the principles of the present invention.

Turning now to the figures, FIG. 1 depicts a flow chart showing the processing for testing and admission of potential participants into the system. Initially, a pension plan or an employee with employer stock applies to be admitted into the system (10). The system administers pre-specified admission tests to check the applicant's employer fit to the system. Such tests may include, for example, credit ratings, stability of earnings/cash flows and susceptibility to business cycles (20).

Failed applicants (30) remain in a separate cybernetic area. When their situations change, the system reconsiders their applications. Upon admission (40), the contributed employer stock is valued using market prices on the transfer date to the system. Also, the applicant selects the proportion of capital appreciation which is allocated to the individual account, $w_j$. The applicant also selects the maximum proportion of the original employer stock which can be sold to increase diversification. The applicant advises the system as to the required payments schedule.

The system next opens two accounts for the applicant (50). The individual account is set as the market value of the contributed employer stock times the individual proportion, $w_j$. The balance is posted in the participant's combined account. The system revalues all system assets at market prices on the admission date using an external pricing source (60). Then, the system performs accounting allocations to old system accounts (70) in accordance with the accounting allocation mechanism described in conjunction with FIG. 3, below.

The contributed stock of the new applicant is next added to system assets (80). The system goes through a portfolio optimization process (90) described in conjunction with FIG. 4. A new portfolio is thus proposed and implemented.

Figure 2:
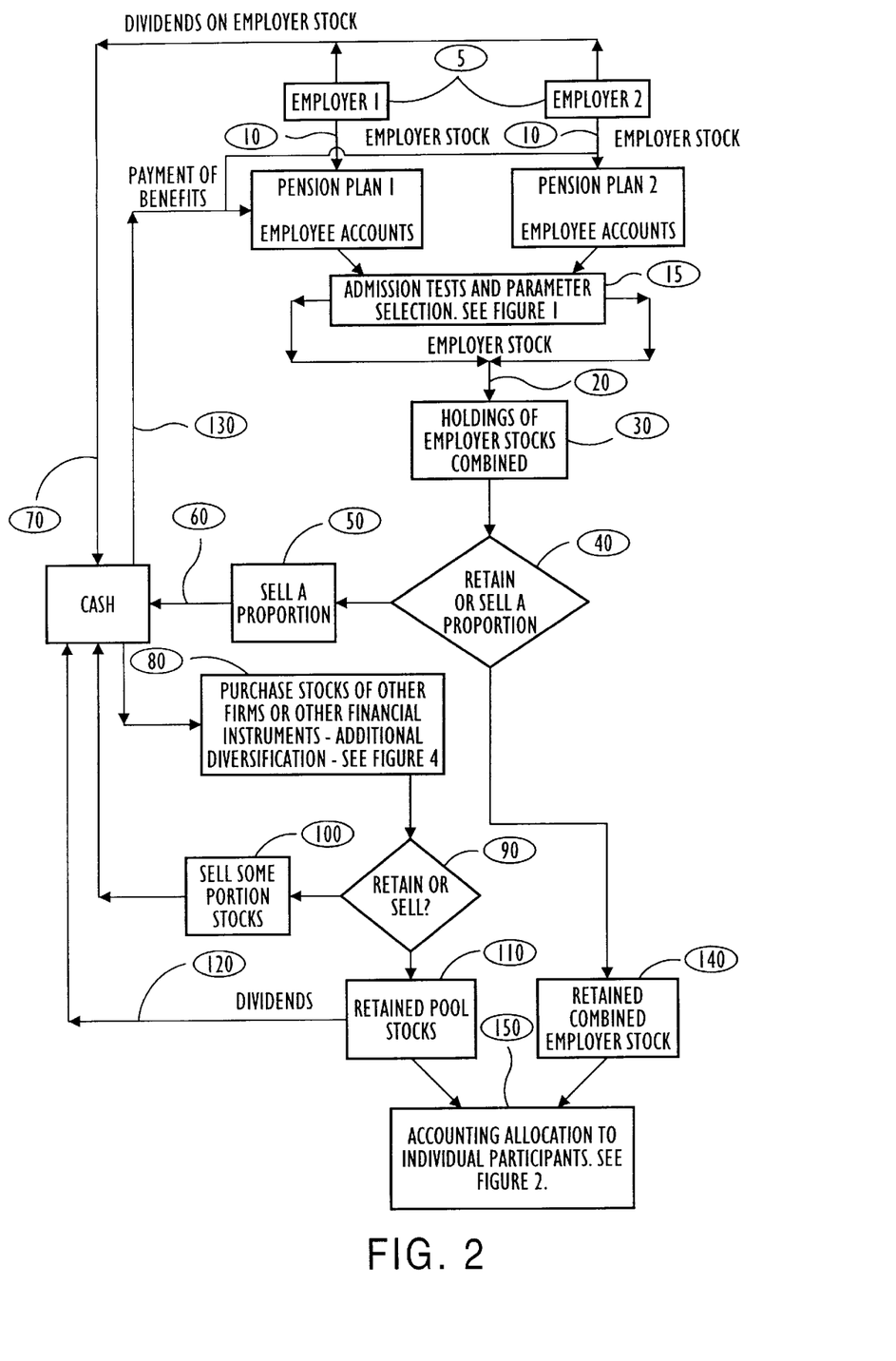
FIG. 2 is a logic flow chart depicting the data processing methodology and structure for cash and stock flows in accordance with the present invention.

FIG. 2 shows, by way of example, cash and stock flows for only two employers (5) and two pension plans or employee accounts. This, of course, is by way of illustration only, as those skilled in the art know that there should be more than two in most instances. In FIG. 2, the employers decide to contribute their own stock (10) to defined benefit pension plans, defined contribution pension plans, to various other employee savings and benefit plans and the like.

The pension plan or the employee applies to be admitted into the system (15). Admission tests and processes are described above in conjunction with FIG. 1. If the candidate is admitted, selection of parameters follows with a valuation of contributed stocks. The participant transfers the employer securities into the combined pool (20). The contributed employer stock is added to the holdings of other contributed stocks (30).

A manager of the combined holdings evaluates diversification needs and required payments to the pension plans (40). Based on this evaluation, the manager may decide to sell a portion of the contributed stock. If the manager sells a portion of the contributed stock (50), the sale will not exceed a pre-selected percentage, $\alpha_j$, of participant or account j's contributed stock. Cash proceeds are next received by the system (60). The system also receives cash from employers as dividends on contributed stocks (70). The system manager may purchase stocks of other firms or financial instruments (80) to obtain additional diversification and manage risk. Such optimization process is described in conjunction with FIG. 4, below.

The system manager may consider whether to sell some of the stocks or financial instruments that were purchased for additional diversification (90). The manager could also sell (100) some of the non-employer-contributed financial instruments. Cash proceeds are received by the system. The non-employer-contributed stock or other financial instruments are retained as assets in the system (110). Market values of these assets are determined.

Dividends received on the non-employer-contributed stock or payments from other financial instruments are added to system cash (120). The system makes payments to participants according to pre-specified requirements (130). The system determines the market value of remaining contributed employer securities (140). Finally, the system allocates its assets (150), i.e. the remaining contributed employer securities, the remaining non-employer-contributed stock and the available cash, to participants. This accounting allocation is described below.

Figure 3:
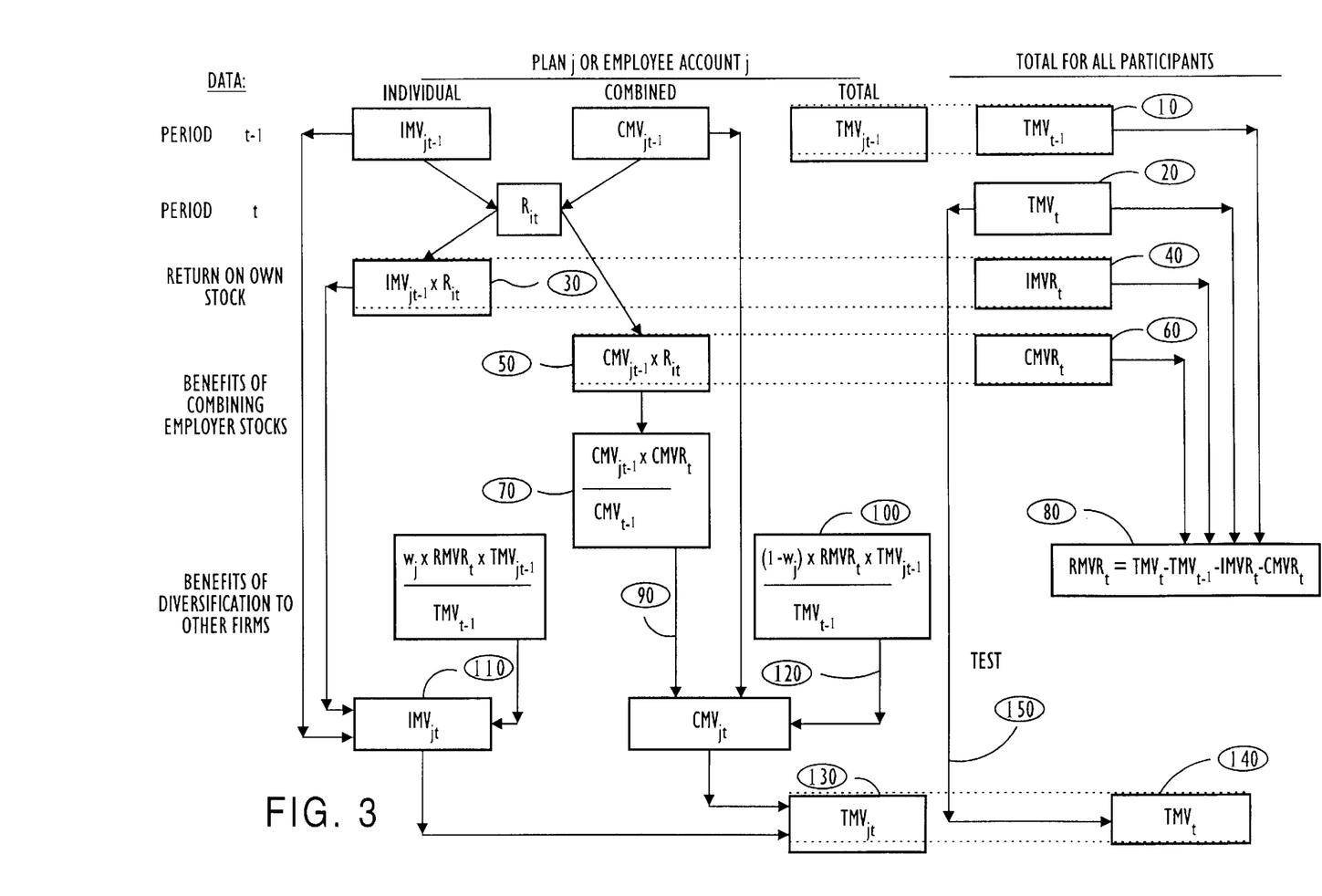
FIG. 3 is a logic flow chart depicting the mechanism for the proper inputs and calculations required for allocation into individual participant accounts.

FIG. 3 depicts a flow chart describing the mechanism for the proper inputs and calculations required for allocation into individual participant accounts. The end of period t-1 data on the balance in the individual, combined, and total account for each plan j or each employee account j is obtained, as well as the total market value of system assets at the end of period t (10).

End of period total market value of system assets is obtained by using an external pricing source (20). The individual account is allocated an "individual" return (30), based on the multiplication of the prior period balance by the return of the employer security corresponding to that account. Total system sum of individual accounts return is obtained by summing the "individual" return computed in (30) over all system accounts (40).

The combined account is allocated an "individual" return, computed as the beginning balance in the combined account times; the return of the employer securities corresponding to that account (50). The new balances in the combined accounts are summed over all system accounts (60). The total represents the combined return on the employer securities. The combined return on employer securities is allocated to each of the system accounts according to their relative market value at the beginning of the period (70).

The return on the non-system financial assets are calculated for the entire system based on the change in the market value of system assets during the period, minus the sum of the individual and combined return (80). This will be allocated to specific accounts. The return on non-employer contributed securities is allocated (90) to the individual accounts based on the selected weight parameter $w_j$ (see FIG. 1). This is allocated to individual accounts based on the relative market value in the account to total market value of system assets at the beginning of the period.

The allocation (100) to the combined account is identical to (90), except that (1-$w_j$) is used. The new individual account balance consists of the sum of the beginning balance, the allocated individual return and the allocated returns from other assets (110). The new combined account balance for each participant (120) consists of the sum of balance at the beginning of the period, the allocated combined return and the allocated return on the other assets. If cash is disbursed to the plan or the individual employee, the account balance is reduced by the disbursed amount.

Total market value for each participant account is calculated as the sum of the participant's two accounts (130). The total market value of system accounts (140) is calculated by summing the total market value of all participants' accounts. A test (150) is performed to check the allocation by comparing the total system market value of assets with (140). The following example illustrates accounting allocation principles in accordance with the present invention.

EXAMPLE 1

Accounting Allocation

Assume that there are P participants (pension plans or employee accounts) in the pool. These are denoted by the subscript j. These plans contain E different employer securities, which are denoted by the subscript i.

Each participant selects a proportion $w_j$ which is used to allocate its own employer security return to the participant's individual account (explained below). For example, plan j may select $w_j$=40%, which means that 40% of its own employer securities are initially assigned to its individual account. In subsequent periods, the returns on the combined portfolio take this proportion into account in allocating returns. The proportion may be restricted between a certain minimum w and 100%.

Each participant has two accounts, which are updated periodically to reflect their current values where:

$IMV_{jt}$ represents the market value of system assets that are allocated to participant j's individual account at the end of period t; and $CMV_{jt}$ represents the market value of system assets that are allocated to participant j's combined account at the end of period t.

The percentage return on employer stock i during period t is denoted by $R_{it}$. For example, if the beginning period price is $10 per share, no dividends are distributed, and if ending period price is $12, $R_{it}$ is equal to 20% (or 0.20).

The total market value of system assets allocated to a participant j at the end of period t is denoted $TMV_{jt}$. The total market value of all system individual participants' accounts is denoted $IMV_t$, and the total system market value of the combined participants' accounts is denoted $CMV_t$.

We can aggregate the market values of participants' accounts to obtain:

$$TMV_t = \sum_{j=1}^{P} TMV_{jt}$$

$$IMV_t = \sum_{j=1}^{P} IMV_{jt}$$

$$CMV_t = \sum_{j=1}^{P} CMV_{jt}$$

The allocation algorithm assumes knowledge of the following data.

1. The balances in each participants individual and combined accounts at the end of the prior period, $IMV_{jt-1}$ and $CMV_{jt-1}$, respectively. These are available from the prior period's ending accounting allocation.

2. The total market value of system assets at the end of the prior period and at the end of the current period, $TMV_{jt-1}$ and $TMV_{jt}$, respectively. The latter is determined by the market value of all system assets (employer stock, other financial instruments and cash) at the end of the period.

3. The percentage return of all employer securities, $R_{it}$, i=1, . . . E, which are obtained by a connection to a security pricing source.

Step 1: Calculate the "individual" return on the individual account balance using the return of the employer stock for each participant j with an employer stock i:

$$IMVR_{ji} = IMV_{jt-1} \times R_{it}$$

Step 2: Calculate the "individual" return on the combined account balance, and aggregate over all participants j with employer securities i contributed to their account. This would have been the return on combined employer securities, absent any dividends or proceeds from sales of employer securities and reinvestment in other firms' securities.

$$CMVR_t = \sum_{j=1}^{P} CMV_{jt-1} \times R_{it}$$

Step 3: Allocate the total return on the combined accounts, $CMVR_t$, to the participants' accounts using their relative weights, as determined by market value of their balances at the beginning of the period:

$$CMVR_{jt} = CMVR_t \times \frac{CMV_{jt-1}}{CMV_{t-1}}$$

Step 4: Calculate the remaining increase (decrease) in market value of system assets that cannot be attributed to return in employer securities:

$$RMVR_t = TMV_t - TMV_{t-1} - IMVR_t - CMVR_t$$

Step 5: Allocate the remaining increase in system assets market value, $RMVR_t$, to each participant's individual account according to the weight $w_j$ chosen by the participant, and the participant's relative weight in system's assets at the beginning of the period:

$$IRMVR_{jt} = w_j \times RMVR_t \times \frac{TMV_{jt-1}}{TMV_{t-1}}$$

Step 6: Allocate the remaining increase in system assets market value, $RMVR_t$, to each participant combined account:

$$CRMVR_{jt} = (1 - w_j) \times RMVR_t \times \frac{TMV_{jt-1}}{TMV_{t-1}}$$

Step 7: Calculate the balance in the participant's individual account at the end of the period as:

$$IMV_{jt} = IMV_{jt-1} + IMVR_{jt} + IRMVR_{jt}$$

Step 8: Assume that participant j receives a cash distribution of $\$D_{jt}$, at the end of the period, after all the previous steps are performed. The participant's new combined balance is now:

$$CMV_{jt} = CMV_{jt-1} + CMVR_{jt} + CRMVR_{jt} - D_{jt}$$

Step 9: If $CMV_{jt}$ is negative, set $IMV_{jt} = IMV_{jt} - CMV_{jt}$, and $CMV_{jt} = 0$.

Step 10: Check computations by testing that $TMV_t$ is equal to the sum of the balances in the participants' individual and combined accounts, minus the sum of all cash payments made to participants.

Figure 4:
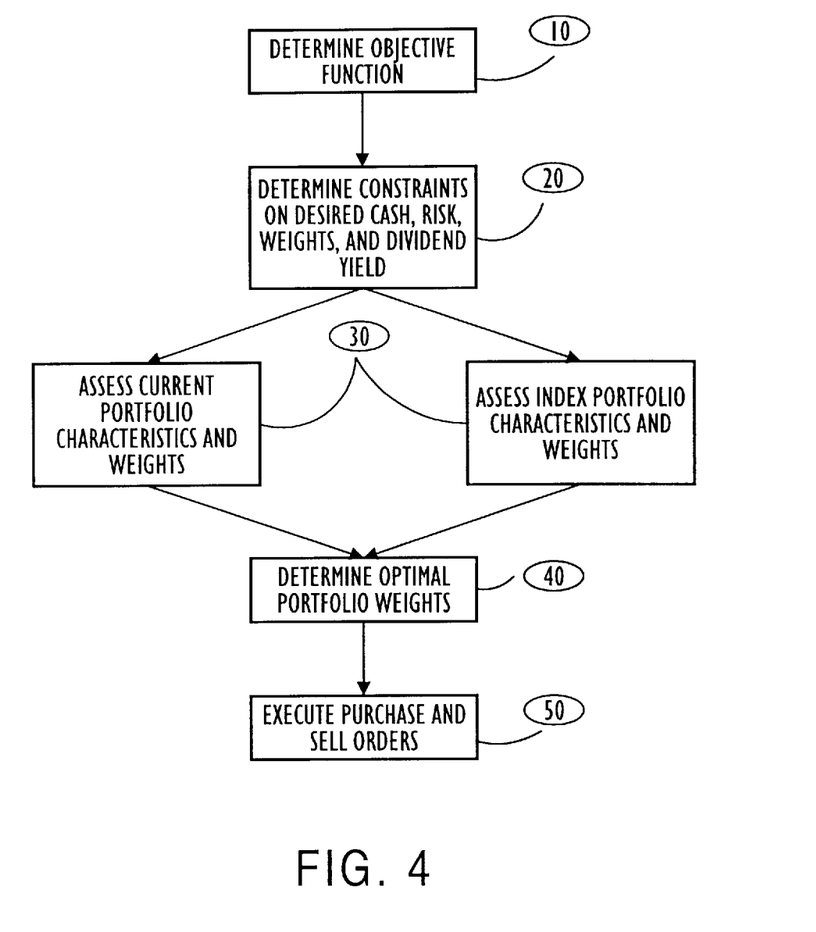
FIG. 4 is a logic flow chart depicting the data processing for portfolio optimization in the system of the present invention.
Figure 5:
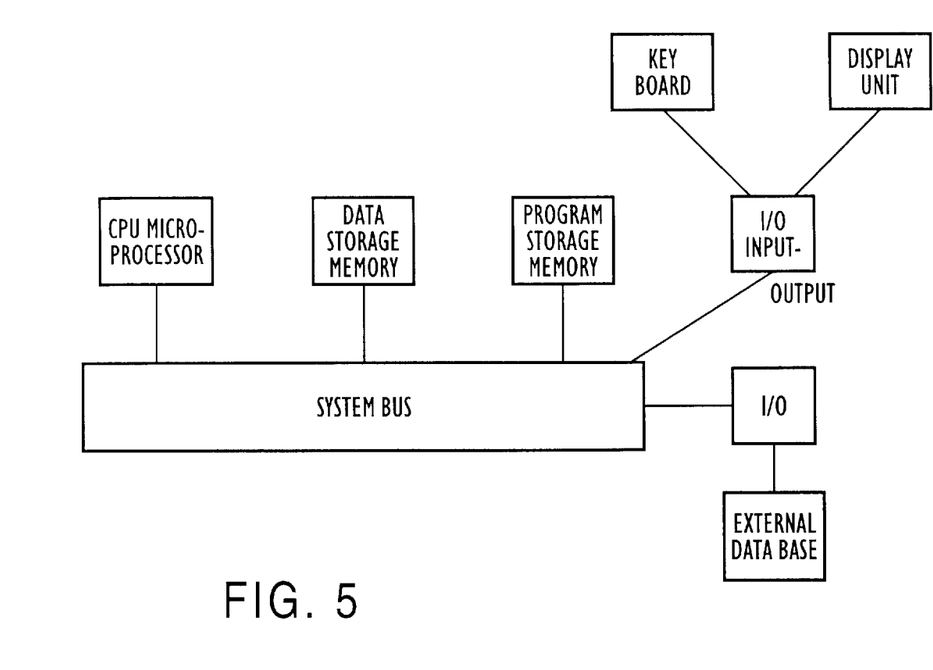
FIG. 5 is a block diagram of the functional components that comprise the inventive system.

FIG. 4 depicts the portfolio optimization process which begins by selecting an objective function (10). For example, the objective function can be to minimize the tracking error of the portfolio return from that of a market index. The tracking error can be expressed as the squared deviation in returns between the portfolio return and the index return. The objective function can include other items such as transaction costs that need also to be minimized.

The portfolio optimizer needs to express a set of constraints (20). For example, the desired cash (for payments to plans or employees) can be expressed in a budget constraint where the net purchases and sales of assets yields a required cash balance. Similarly, the portfolio risk can be set equal to the market risk, as expressed by the index. The portfolio optimizer can specify a minimum dividend yield on the portfolio to ensure the system's liquidity.

System liquidity helps in further diversification and in making payments to plans and employees without liquidating employer securities in the combined portfolios. Other constraints can be used on individual stock (or industry) weights in the optimal portfolio. These can be minimum bounds (for example, the maximum amount that can be sold of an employer security may be specified as 90%, so its minimum weight is dictated by this constraint), or maximum amounts (to minimize the weights of any single stock).

The current portfolio and index weights are determined using an external pricing source (30). Also, to simplify the optimization, each security (in the portfolio or in the index) can be assessed according to some fundamental characteristics (factors). These can be the loadings on the sensitivity to macroeconomic variables, industry variables, or some firm-specific attributes. These loadings will be assessed using historical data obtained from other financial databases.

The optimizer solves a quadratic program (for a quadratic objective function), and supplies optimal portfolio weights (40). Finally, purchases and sales orders are issued to trading desk (50). The following example illustrates a possible portfolio optimizer in accordance with the present invention. The example is merely illustrative as other forms are known to those skilled in the art depending on system needs and objectives.

EXAMPLE 2

Portfolio Optimization

The portfolio optimization problem can be written as:

$$\min_{w_p} E[w'_p r_p - w'_m r_m]^2 + t'_p w_p$$

which is subject to:

$$W'_p V_p - W'^o_p V_p = C$$

$$w_p > w$$

$$w'_p b_p = 1$$

$$w'_p y_p = Y$$

and wherein the following are defined as:

$w_p$, $w_m$, $w_p^0$ are the weights of the new portfolio p, the market index m, and the existing portfolio. Weights are the proportion of total portfolio market value invested in each security. The variables are vectors of weights of order (1 xn), (1 xm) and (1 xk), respectively.

$r_p$, $r_m$ are the vector of returns on the new portfolio and market index, respectively.

$t_p$ is the vector of transaction costs corresponding to new portfolio purchases and sales.

$v_p$, $v_p^0$ are the vectors of market values of the new and existing portfolios.

C stands for required system cash.

w is the vector of system minimum weights on each portfolio holding.

$b_p$, $y_p$ are vectors of security betas and dividend yields. Betas are calculated with respect to the market index.

Y defines the desired new portfolio minimum dividend yield.

The above-described arrangement is merely illustrative of the principles of the present invention. Numerous modifications and adaptations thereof will be readily apparent to those skilled in the art without departing from the spirit and scope of the present invention.

What is claimed is:

1. A system for managing, diversifying, and optimizing a portfolio of pension plans comprising employer-contributed securities of different employers, for a group of participants, comprising:

means for storing in accessible memory data representing a market value of employer-contributed securities in a particular pension plan for each pension plan in said portfolio, data representing select characteristics of said employer-contributed securities; and data representing select criteria of each participant, wherein the participants are selected from the group consisting of:

individual employees in a pension plan having employer-contributed shares, pension plans having employer-contributed shares, and combinations thereof;

means for determining a diversified allocation of portfolio assets among the employer-contributed securities based on said select characteristics, subject to said select criteria and predetermined constraints, wherein the means for determining said diversified allocation of portfolio assets further comprises an optimizer for minimizing the deviation in returns between the portfolio and a preselected objective function; and means for transferring assets from and to said portfolio to achieve said diversified allocation.

2. The system of claim 1, further comprising:

means for storing in accessible memory data representing admission requirements and means for selecting participants according to said admission requirements.

3. The system of claim 1, wherein said select criteria comprises a schedule of required payments to one or more of said participants.

4. The system of claim 1, further comprising means for allocating portfolio assets to the purchase of financial instruments other than employer contributed securities.

5. The system of claim 1, further comprising means for limiting the amount of the original employer-contributed securities which may be sold to achieve diversification, said limit selected by said employer, thereby allowing the employer to specify the amount of employer-contributed securities which remains in said employer's control.

6. The system of claim 1, further comprising means for accruing in an account for each participant a participant-selected proportion of future returns on each said participant's own employer's stock, thereby allowing each participant to choose the portion of any increase in said participant's own employer's stock which is allocated to said participant.

7. A method for managing, diversifying, and optimizing a portfolio of pension plans comprising employer-contributed securities of different employers, for a group of participants, comprising the steps of:

determining a diversified allocation of portfolio assets among said employer-contributed securities based on select characteristics subject to select criteria and predetermined constraints, wherein the participants are selected from the group consisting of:

individual employees in a pension plan having employer-contributed shares, pension plans having employer-contributed shares, and combinations thereof, and wherein the step of determining said diversified allocation further comprises optimization of said allocation by minimizing the deviation in returns between the portfolio and a preselected objective function; and transferring assets to and from said portfolio to achieve said diversified allocation.

8. The method of claim 7, further comprising the step of allocating portfolio assets to the purchase of financial instruments other than employer contributed securities.

9. The method of claim 7, further comprising the steps of limiting the amount of original employer-contributed securities which may be sold to achieve diversification, said limit selected by said employer, thereby allowing the employer to specify the amount of employer-contributed securities which remains in said employer's control.

10. The method of claim 7, further comprising the steps of accruing in an account for each participant a participant-selected proportion of future returns on each said participant's own employer's stock, thereby allowing each participant to choose the portion of any increase in said participant's employer's security which is allocated to said participant.

* * * * *